United States Patent [19]

O'Brien

[11] 4,268,741
[45] May 19, 1981

[54] ELECTRIC FRY PAN

[75] Inventor: William J. O'Brien, Vaucluse, Australia

[73] Assignee: Breville Holdings Pty. Limited, Pyrmont, Australia

[21] Appl. No.: 61,310

[22] Filed: Jul. 27, 1979

[51] Int. Cl.³ .............................................. F27D 11/02
[52] U.S. Cl. ...................................... 219/439; 99/447;
219/430; 219/438; 219/462; 219/530
[58] Field of Search ............... 219/430, 432, 438, 439,
219/441, 442, 462, 464, 530, 540, 457; 99/325,
447; 29/611

[56] References Cited

U.S. PATENT DOCUMENTS

| 3,010,006 | 11/1961 | Schwaneke | 219/438 X |
|---|---|---|---|
| 3,031,735 | 5/1962 | Jepson | 219/438 X |
| 3,064,112 | 11/1962 | Hanzel | 219/438 X |
| 3,082,313 | 3/1963 | Jepson et al. | 219/441 |
| 3,095,498 | 6/1963 | Foster | 219/441 |
| 3,384,195 | 5/1968 | Jepson et al. | 219/442 |
| 3,681,568 | 8/1972 | Schaefer | 219/432 |
| 3,798,415 | 3/1974 | Graham | 219/441 |
| 4,024,377 | 5/1977 | Henke | 219/439 |

FOREIGN PATENT DOCUMENTS

| 115421 | 12/1929 | Austria | 219/438 |
|---|---|---|---|
| 866220 | 2/1953 | Fed. Rep. of Germany | 219/438 |
| 663730 | 4/1929 | France | 219/438 |
| 450882 | 7/1936 | United Kingdom | 219/438 |

Primary Examiner—Volodymyr Y. Mayewsky
Attorney, Agent, or Firm—Michael J. Striker

[57] ABSTRACT

An electric fry pan in which the pan is formed from cast iron to the underside of which a heat sink of aluminium is secured by mechanical means, the heat sink making close physical contact with a major portion of the underside of the pan. The electric heater element is associated with the heat sink and has connected to it an electrical connector by means of which the heater element may be connected to an electricity supply.

6 Claims, 3 Drawing Figures

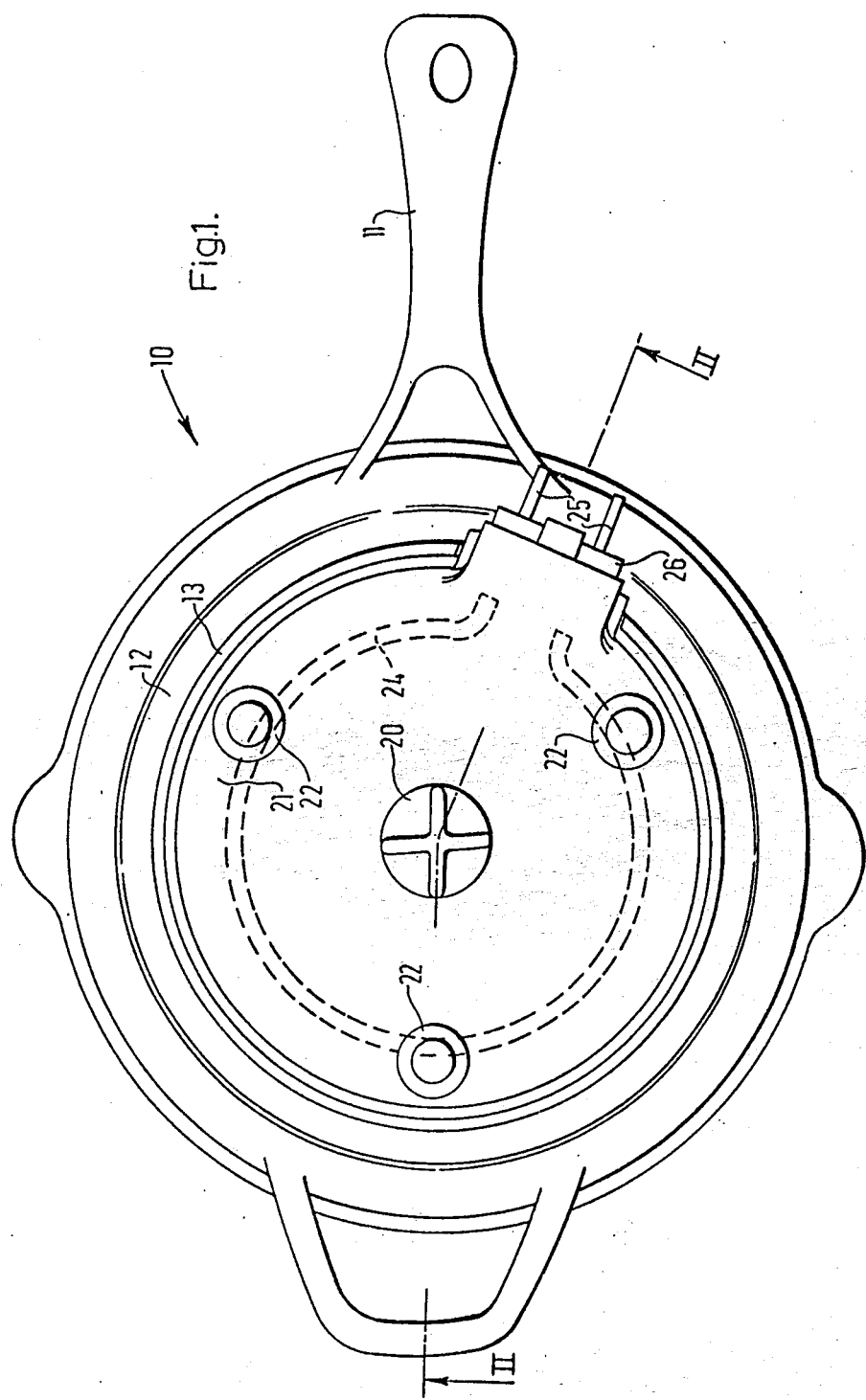

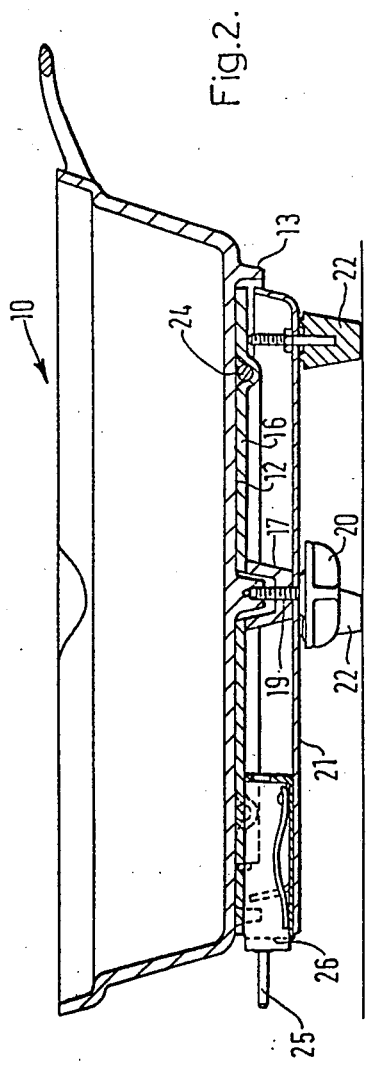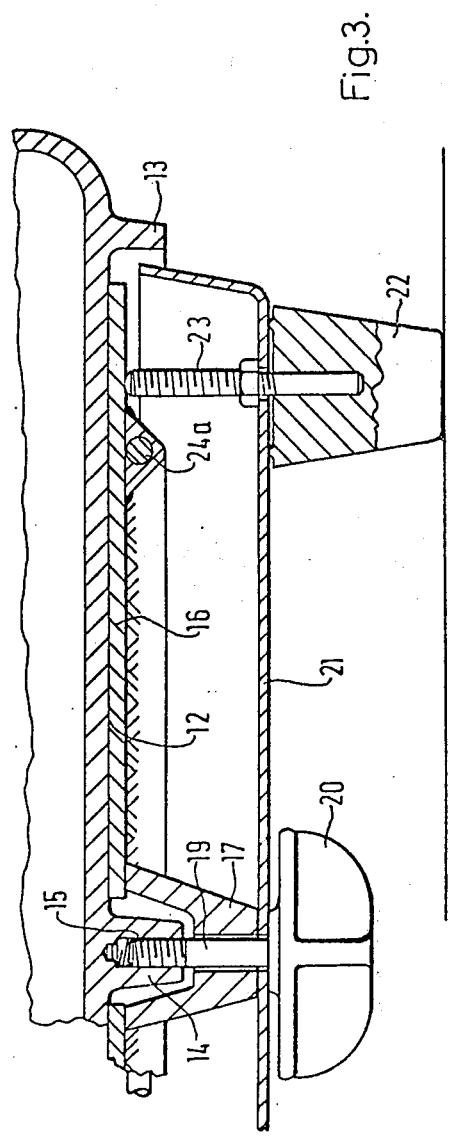

4,268,741

ELECTRIC FRY PAN

BACKGROUND OF THE INVENTION

The present invention relates to an electric fry pan of the kind in which the fry pan is heated by means of an electric heating element in the base of the pan.

It is well known to make fry pans of aluminium or of aluminium lined with a very thin layer of stainless steel in which the heating element is cast into the underside of the base of the pan, provision being made for the connection of a temperature control device to the heating element. The device is normally connected to the pan by means of a plug and socket connector so as to be removable from the pan when it has to be washed.

Electric fry pans of the kind described above are sold in substantial quantities and generally provide a satisfactory means for cooking a wide variety of foodstuffs. A difficulty does however arise in connection with known fry pans in that the heating element, which is necessarily arranged to form a closed path in the base of the pan, cannot provide heat equally to the whole of the interior surface of the base of the pan; the very good heat conduction properties of aluminium tend to mitigate against this. If for example water is placed in a pan and the heating element energised, the water immediately above the heating element will start to boil first and the outline of the heating element can be readily seen.

It is also well known that fry pans of cast iron have desirable qualities from a culinary point of view, so far as uniformity of heating over the whole area of the base is concerned. It has however not previously been proposed to apply electrical heating to a fry pan of this kind, possibly because of the difficulties of incorporating the heating element in the material of the pan.

SUMMARY OF THE INVENTION

The object of the present invention is to provide a fry pan having in combination the features of the two types of fry pan described above.

The invention consists in an electric fry pan wherein the pan is formed from cast iron to the underside of which a heat sink of aluminium is secured by mechanical means, the heat sink making close physical contact with a major portion of the underside of the fry pan, an electric heater element being associated with the heat sink and having connected to it electrical connector means whereby an electrical connection may be made to the heater element.

In order that the nature of the invention may be better understood a preferred form thereof is hereinafter described by way of example with reference to the accompanying drawings.

BRIEF DESCRIPTION OF THE DRAWINGS

FIG. 1 is a plan view of the underside of a fry pan according to the invention,

FIG. 2 is a median section thereof on line II—II of FIG. 1, and

FIG. 3 is a view of a portion of FIG. 2 to an enlarged scale showing the construction in more detail and illustrating the use of an alternative form of heating element.

DESCRIPTION OF A PREFERRED EMBODIMENT

In the preferred form of the invention a fry pan 10 is made in cast iron by suitable casting techniques. The handle 11 of the pan may itself be cast integrally with it or provision may be made for the attachment of a separate handle.

The underside of the base 12 of the fry pan is flat, apart from the peripheral rim 13 and the central boss 14. The central boss 14 is drilled and the resulting hole internally threaded at 15. The area of the underside of the base 12 between the peripheral rim 13 and the boss 14 is machined to provide a flat surface against which an aluminium heat sink 16 is held in close contact by means of the insulator 17. The whole assembly is held in position by means of a zinc plated brass screw 19 having a moulded plastic head 20. The end of the screw 19 screws into the thread 15 in the boss 14.

Extending over the whole area of the base within the peripheral rim 13 is a metal heat shield 21 which is also held in place by the screw 19 and which has arranged around its periphery three feet 22 on which the fry pan normally stands. These are fixed to the heat shield 21 by screws 23 which also serve to hold the periphery of the heat sink 16 in contact with the underside of the base of the fry pan.

Arranged in contact with the heat sink 16 is the heating element 24 to which is connected an electrical connector 25 by means of which a conventional probe/thermostat 26 can be connected.

The pan may be readily separated from the heat sink, heating element, heat shield and feet by simply unscrewing the head 20 of the screw 19.

FIG. 3, apart from showing the construction in more detail, shows an alternative form of heating element 24a which is of trianglar cross section and which is secured by brazing directly to the underside of the heat sink 16. This form of heating element is preferred as, being applied to the underside of the heat sink, heat is already distributed to some extent before reaching the base 12 of the fry pan 10, the object being to distribute the heat as evenly as possible over the base 12.

Experiment has shown that the construction described above provides very good results which, for certain types of cooking, are superior to those provided by a conventional aluminium fry pan and which in use is more convenient than the conventional cast iron fry pan which requires an external source of heat. It is to be understood that the electric heating elements 24 and 24a and electrical connector 25 are electrically insulated from the pan 10 and the heat sink 16.

The embodiment of the invention described above is given by way of example only as constituting a preferred form of the invention within the scope of the succeeding claims.

I claim:

1. An electric fry pan, comprising an electric heating element connectable with an electric source and having a predetermined configuration; a heat distributing element constituted of aluminum and being in contact with said heating element so as to be heated by the latter; and a pan having an underside with a major portion which is in contact with said heat distributing element so that heat is transmitted from the latter to and distributed over said pan, means for securing said aluminum heat distributing element to said underside of said pan, said electric heating element being secured to said heat distributing element, said electric heating element being electrically insulated from said heat distributing element and said pan, and electric connecting means arranged to connect said electric heating element with the electric source and being electrically insulated from said heat distributing element and said pan, said pan having a bottom wall and side walls constituted of cast iron having high heat capacity and low thermal conductivity, so as to provide for a large heat reservoir ensuring good culinary properties and at the same time to avoid a localization of heat in said pan in the regions corresponding to the configuration of said electric heating element.

2. An electric fry pan as defined in claim 1, wherein said heat distributing element is formed as an aluminum plate having an under face, said electric heating element being secured to said under face of said aluminum plate.

3. An electric fry pan as defined in claim 2, wherein said securing means includes a boss provided on said underside of said pan and having an internally threaded hole, a pressing member arranged to press said heat distributing element against said underside of said pan, and a single threaded member extending through said pressing member and through said threaded hole of said boss of said pan, so as to attach said pressing member and thereby said heat distributing element to said pan.

4. An electric fry pan as defined in claim 3, wherein said threaded member is a screw having a head arranged to abut against said pressing member.

5. An electric fry pan as defined in claim 1; and further comprising a heat shielding element arranged beneath said underside of said pan and secured to the latter, said heat shielding element being provided with a plurality of legs arranged to support said pan when in use.

6. An electric fry pan as defined in claim 1, wherein said bottom wall is of one piece with said side walls so that said pan is a one-piece member of cast iron.

* * * * *